March 15, 1955

C. CHRISTIANSEN 2,704,163

LOCKING MECHANISM FOR SIDE DISCHARGE
MATERIAL HANDLING SCOOP

Filed Sept. 27, 1951

Inventor
Christian Christiansen

By Vernon A. Dorsey
Attorney

March 15, 1955
C. CHRISTIANSEN
2,704,163
LOCKING MECHANISM FOR SIDE DISCHARGE
MATERIAL HANDLING SCOOP
Filed Sept. 27, 1951
2 Sheets-Sheet 2
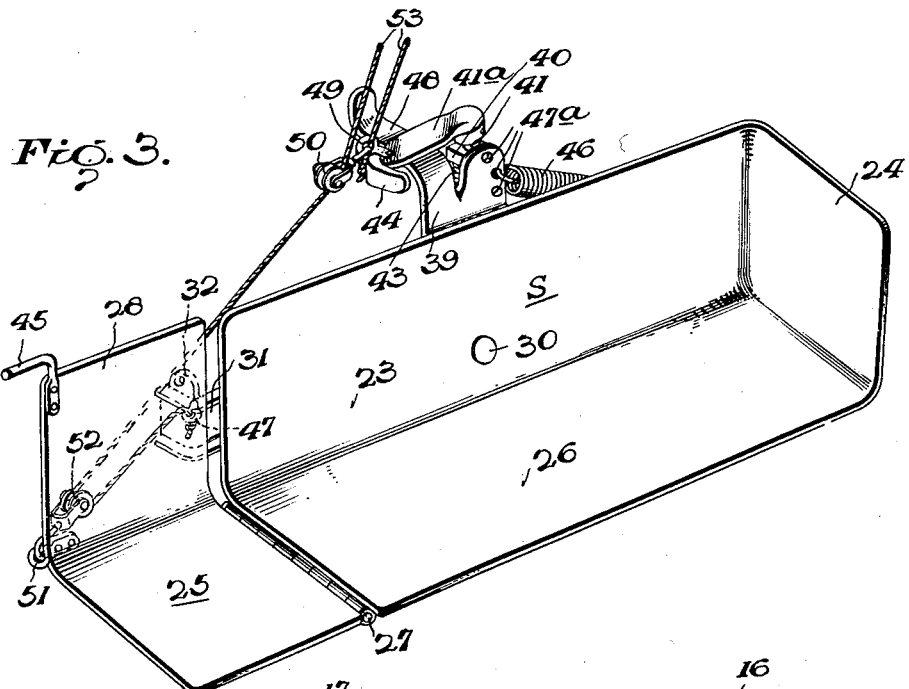
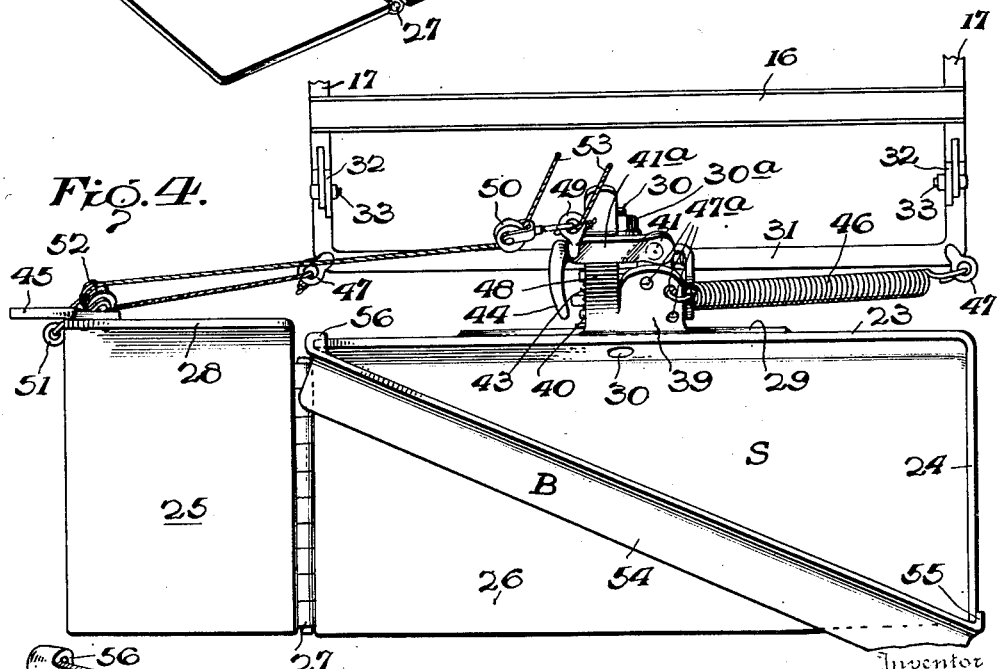
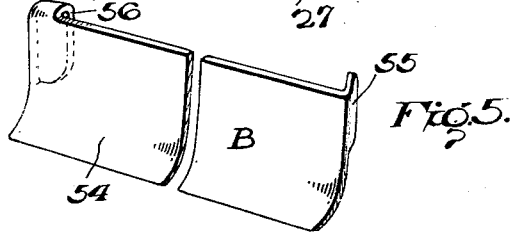
Inventor
Christian Christiansen.
By Vernon A. Dorsey
Attorney

United States Patent Office 2,704,163
Patented Mar. 15, 1955

2,704,163

LOCKING MECHANISM FOR SIDE DISCHARGE MATERIAL HANDLING SCOOP

Christian Christiansen, St. Cloud, Minn.

Application September 27, 1951, Serial No. 248,508

2 Claims. (Cl. 214—140)

The present invention relates to an attachment to be used with load lifting and carrying means and contemplates a scoop of a particular type adapted to be attached to the load lifting and carrying means of a tractor, the load lifting and carrying means being, for instance, of the type shown in my prior Patents 2,065,171 of December 22, 1936, and 2,082,686 June 1, 1937. While I mention load lifting and carrying means of the type shown in these two patents, the scoop attachment of the present invention can be attached to and used with any type of load lifting and carrying means used with a tractor wherein the load lifting and carrying means has power means for raising the load through a boom.

Material handling attachments of the above type generally contemplate two arms or booms which are attached to a framework on each side of the tractor, one end of the arm being pivoted to the frame of the tractor or to a detachable frame attached to the frame of the tractor, together with power means for lifting the arms or booms in unison so that the outer ends of the arms are raised from ground position and elevated.

While load carrying means heretofore used have been in the form of forks or buckets which are raised in front of the tractor to transport the load in this position or to dump the load into a vehicle directly in front of the tractor, there has never been, so far as I am aware, load carrying means of this type in which the material can be discharged to one side of the tractor, which is desirable in removing dirt or snow from a road or street. At least heretofore all load carrying means for removing material to one side of the tractor, so far as I am aware, have comprised a boom or beam which is turnable in relation to its mounting on the tractor, thus allowing the material to be discharged to one side of the road or street.

This invention also contemplates a material removing scoop which besides having a side discharge can be used as a bulldozer when the scoop and the attachment are pushed forward by the tractor and the scoop engages the ground.

Further advantages of the invention will be described in connection with the drawings.

In the drawings:

Fig. 3 is a perspective view showing the front of the scoop, the same being in the load discharge position, that is, with a side wall opened up.

Fig. 4 is a top plan view of the scoop in an open position, that is, one side wall down and an attachment mounted in the body of the scoop forming an earth moving machine of the bulldozer type.

Fig. 5 is a top plan view of the bulldozer blade used in connection with the scoop when the hinged end wall of the scoop is in a horizontal position as shown in Figs. 3 and 4.

Figure 1:
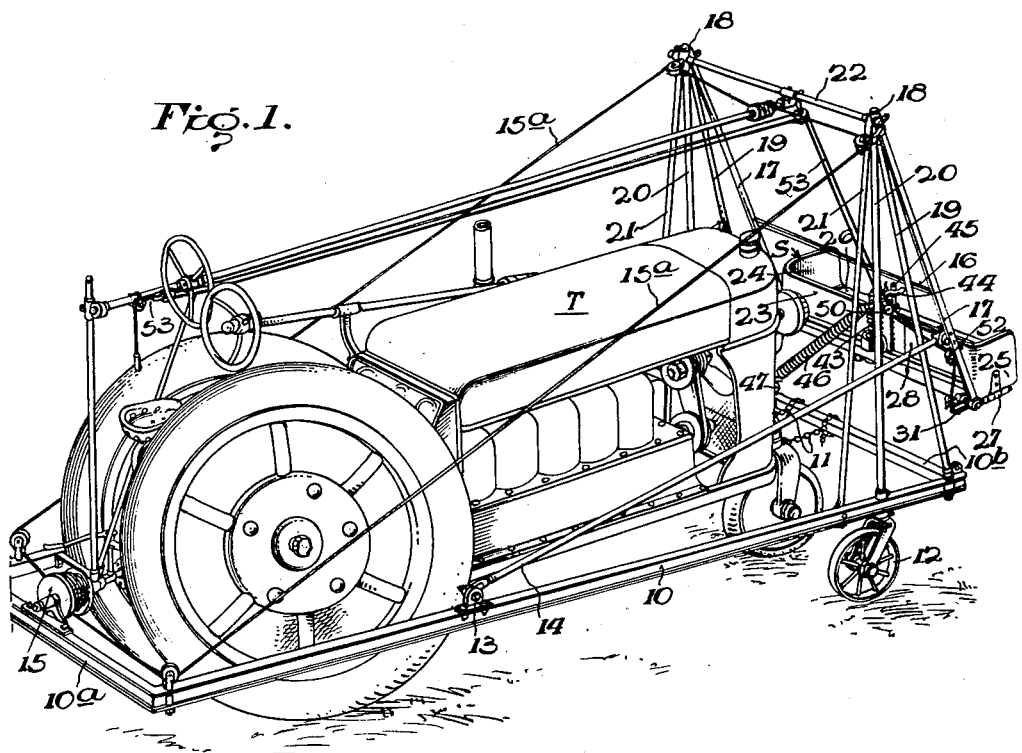
Fig. 1 is a perspective view of the scoop of my invention mounted on the forward end of a tractor.

Referring to Fig. 1, T represents a conventional farm tractor having a supporting frame 10 mounted thereon, the same forming an attachment to which various material handling devices can be attached to the fore end thereof. The rear end 10ª of the frame 10 is attached to the draw bar of the tractor, not shown, and the front 10ᵇ of the frame 10 is attached to the front frame of the tractor by chains 11. As the attachment of the frame of the handling device to the tractor forms no part of the invention, the same is not shown in detail. The rear end 10ª of the frame 10 is, of course, supported by the draw bar (not shown) and the front thereof is supported by pivotally mounted wheels 12 on the front of the frame 10. Mounted on each side of the frame 10 by pivoted connections 13 are companion booms 14. Power mechanism for lifting the ends of the booms 14 around the pivot 13 comprises a power take-off in the form of a drum 15 carried on the rear end 10ª of the frame 10. Through this power take-off the positions of the outer ends of the booms 14 are controlled by the cables 15ª, the outer ends of said cables being attached to the ends of the booms and the inner ends of the cables being wound around the power drum 15. The cables and power take-off comprise means for lowering the ends of the booms and the attachment thereon into ground engaging position or in an elevated position so that the material in the scoop attachment can be removed to a distant position while in the elevated position or the material can be dumped when in the elevated position to one side of the tractor as will more fully be explained.

The outer ends of the booms are rigidly connected together by a crosspiece 16 so that said booms operate in unison regardless of the lifting mechanism exerting pressure thereon.

Each end of the booms 14 are pivotally connected to vertical rods 17 which are slidably mounted in bearings 18 supported by a framework comprising the uprights 19, 20 and 21 and the crossbar 22, the base of the uprights 19, 20 and 21 being rigidly secured to the frame 10 carried by the tractor. The elements 19, 20, 21 and 22 above described form an elevated support on the front of the frame 10.

Figure 2:
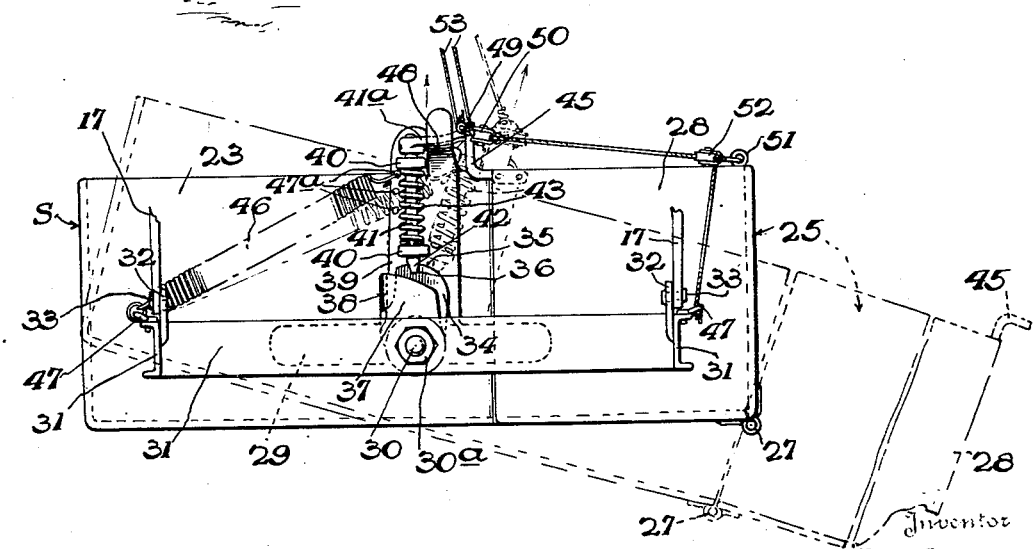
Fig. 2 is a rear view of the scoop attachment, the same being shown in full lines in the closed position to confine the material therein, and in the dotted line position to show the position of the scoop when discharging the material.

The scoop S of the present invention is a material handling device having an open front, a sloping back wall 23, one integral end wall 24 and a hinged end wall 25, together with a bottom 26. Like most scoops the same has no front wall so that material can enter the scoop body, when the scoop is projected into the material. The hinged end wall 25 is attached to the bottom of the scoop by a hinge 27, said hinge extending the width of the bottom of the scoop. The hinged end 25 of the scoop is in the form of an L, that portion 28 thereof forms an extension of the back 23 of the scoop when the end wall of the scoop is in a lowered position, see Figs. 3 and 4. The portion 28 of the hinged end of the scoop is behind the back wall 23 of the scoop when the hinged end of the scoop is in an up position, see Fig. 2, that is, in a material retaining position. On the back of the wall 23 of the scoop is welded a plate 29, see Fig. 2, having an opening therein to receive the bolt 30, the head of which is welded to the front of the back 23 of the scoop. The bolt 30 which forms a bearing mounting for the scoop is located in the back wall 23 of the scoop S midway between the sides of the scoop.

Between the scoop S and the ends of the booms 14 is interposed a member 31, the same being a C-shaped channel iron, the outer ends having lugs 32 welded on their tops, which lugs are connected to the rods 17 by bolts 33 thus forming a pivotal connection. The C-shaped member 31 has in its center an opening through which penetrates the bolt 30 forming a pivotal connection for the scoop on the C-shaped member 31. A nut 30ª retains the bolt 30 in contact with the C-shaped member 31. Welded to the front of the C-shaped channel iron 31 is an upright plate 34 having a rounded upper surface 35, said rounded surface having a notch 36 therein the function of which will be described later. Interposed between the upright plate 34 and the C-shaped channel iron 31 is a stop 37 for the scoop S. This stop has a right angle projection 38 thereon which engages one side of the plate 39 welded to the back of the scoop.

Projecting backwardly from the plate 39 are two offsets 40 in which are mounted a trigger mechanism comprising the L-shaped member 41, the same being mounted in the offsets 40. The vertical stem of the L-shaped member 41 has its lower end formed in the shape of a dog 42, said dog being normally urged by a spring 43 to enter the notch 36 in the upright plate 34 when the scoop S is in a horizontal position. When the scoop is in a tilted position, that is, in a side discharge position, the dog 42 rides over the curled upper surface 35 of the plate 34. The outer end 41ᵃ of the L-shaped member 41 has a right angle projection 44 that normally engages the hook 45 which is welded on the top of the back of the hinged end section 25 of the scoop. The catch mechanism above described comprises means for holding the hinged end 25 of the scoop in an upright position, that is, in material holding position.

Spring 46 has one of its ends attached to one of the eyelets 47. These eyelets 47 are formed on the upper surface of the C-shaped member 31 adjacent the lugs 32. The other end of the spring 46 is attached to the plate 39 by placing the curled end of the spring 46 in one of the openings 47ᵃ within the plate 39. These openings 47ᵃ provide means for tensioning the spring and therefore the force exerted by the spring to right the scoop to a horizontal position after the material therein has been discharged over the end of the side wall section 25 of the scoop.

Formed on the top of the plate 39 is a curved projection 48, the upper surface of which forms a cam for listing the outer end 41ᵃ of the trigger mechanims.

Attached to the outer end of the arm 41ᵃ of the trigger mechanism is an eyelet 49 having a pulley 50 mounted therein. Welded to the outer edge of the hinged section 25 of the scoop where the side wall and the back wall 28 thereof meet is an eyelet 51 in which is mounted a pulley 52.

A rope 53 has one end attached to the eyelet 49 of the trigger mechanism which mechanism locks the scoop in a horizotnal position, the rope thereafter extends back adjacent the driver's seat of the tractor and then forward to the pulley 50 retained in the eyelet 49 and thence to the pulley 52 attached to the outer end of the hinged side 25 of the scoop and then where it is anchored to the eyelet 47, which eyelet is attached to the top of the C-shaped member 31.

The above described mechanism comprises means for unlocking the catch members 44 and 45 which retain the hinged side wall 25 of the scoop in a horizontal position and for unlocking the mechanism for retaining the body of the scoop in a horizontal position through the disengagement of the dog 42 from out of the notch 36.

The first pull on the rope 53 by the operator releases the pivoted end 25 of the scoop and allows the same to assume a horizontal position. This is because the pull on the rope disengages the hook members 44 and 45 and a further pull on the rope pulls the outer end of the arm 41ᵃ up the curved surface 48 of the plate 39, thus lifting the spring projected dog 44 of the L-shaped member 41 out of the notch 36 in the plate 34.

The downward swing of the hinged end wall 25 of the scoop increases the leverage on the bearing formed by the bolt 30 and therefore tends to urge the scoop to assume a tilting position from its horizontal position when the catch formed by the dog 42 is removed from the notch 36.

After the material has been discharged from the scoop in the tilted position, the operator pulls on cord 53 lifting the side wall 25 of the scoop and the spring 46 moves the scoop to a horizontal position. As the scoop assumes its horizontal position the dog 42 rides over the curved upper surface 35 of the plate 34 until the dog 42 engages the notch 36, the dog being urged to penetrate said notch by the spring 43.

When the hinged side wall 25 of the scoop S is in a lowered position, as shown in Figs. 3 and 4, the scoop can be used to remove material to the side of the pushing tractor without elevating the scoop and discharging the material from said elevated position. This is accomplished by the attachment of a blade B, see Figs. 4 and 5. Said blade has a curved front face 54, the same being typical of a bulldozer blade. The attachment B is placed on the bottom 26 of the scoop S, one edge of the blade 54 near its top having a projection 55 which is placed on the outer side of the side wall 24 of the scoop. The other end of the blade 54 has a hook projection 56 welded to its outer edge and top. This hook projection 56 encircles an upper corner and back 23 of the scoop at the corner thereof over the hinge 27. With this attachment in the scoop and the side wall 25 of the scoop in a horizontal position, the scoop becomes a bulldozer when the tractor having the scoop mounted thereon is moved over the ground with the front edge of the scoop in contact with the ground. The material which accumulates on the upper surface of the bottom 26 is removed by the blade B in a rearwardly and diagonal position so that the material is deposited on the hinged end 25 of the scoop in contact with the back 28 thereof.

My invention, as described, contemplates a material handling attachment for tractors which can be used either as a scoop to lift the material and discharge the same at the side of the tractor carrying the scoop or as a bulldozer for removing the material sideways without lifting the scoop.

What I claim is:

1. A material handling attachment for the outer ends of power actuated pivoted boom members for tractors, comprising a scoop, a connecting member between the pivotally mounted boom members having one element of a bearing therein and a locking catch mechanism thereon, a scoop having a pivotal bearing member in the center of the back of the scoop for mounting the scoop to the bearing element on the connecting member between the power lifting means, an element of a catch mechanism also mounted on the back of the scoop adajcent the bearing element, said scoop having one side hinged to the bottom thereof, locking means for retaining the hinged side of the scoop in an upright position with means for dumping the scoop by turning the same around its pivotal bearing, said means comprising an operator which releases the locking means for the hinged side of the scoop in its first movement and on a further movement releases the horizontal locking catch means for the scoop.

2. A material handling attachment for the outer ends of power actuated pivoted boom members, comprising a scoop attached to the outer ends of said boom members through a connecting member between the boom members, a bearing member for the scoop on said connecting member, locking means on the connecting member for retaining the scoop in a horizontal position, said locking means comprising a slot, said scoop having in the center of its back thereof a bearing member and a trigger mechanism comprising a spring urged dog for entering the slot in the connecting member between the boom members, said scoop having a hinged side wall, a catch for retaining the hinged side of the scoop in an upright position with means for tilting the scoop from its horizontal position, said means being an operator which in its first movement releases the retaining catch for the side wall of the scoop from its upright position and in a further movement releases the dog on the back of the scoop from the notch in the connecting member between the boom members.

References Cited in the file of this patent

UNITED STATES PATENTS

| | | |
|---|---|---|
| 1,466,464 | Beatty | Aug. 28, 1923 |
| 1,891,458 | Stark | Dec. 20, 1932 |
| 1,921,917 | Flowers | Aug. 8, 1933 |
| 2,455,160 | Burrow | Nov. 30, 1948 |
| 2,468,326 | Gleason | Apr. 26, 1949 |
| 2,488,695 | Upton | Nov. 22, 1949 |
| 2,530,414 | Wells | Nov. 21, 1950 |
| 2,585,095 | Daniels | Feb. 12, 1952 |
| 2,631,745 | Addison | Mar. 17, 1953 |

FOREIGN PATENTS

| | | |
|---|---|---|
| 873,189 | France | Mar. 9, 1942 |